United States Patent [19]

Ganter et al.

[11] Patent Number: 4,493,637
[45] Date of Patent: Jan. 15, 1985

[54] FOSSIL FUEL CATALYST GENERATOR

[75] Inventors: Robert Ganter, Mount Penn; Robert Whitmoyer, Selins Grove; Palle Rye, Shillington, all of Pa.

[73] Assignee: Thermics Corporation Liquidating Trust, Mount Penn, Pa.

[21] Appl. No.: 589,041

[22] Filed: Mar. 14, 1984

Related U.S. Application Data

[63] Continuation of Ser. No. 287,014, Jul. 27, 1981, abandoned, which is a continuation of Ser. No. 12,411, Feb. 15, 1979, abandoned, which is a continuation-in-part of Ser. No. 878,130, Feb. 15, 1978, abandoned.

[51] Int. Cl.³ .............................................. F23J 1/00
[52] U.S. Cl. ......................................... 431/190; 431/4; 123/25 R; 261/122; 55/440
[58] Field of Search .................. 431/4, 190; 123/25 R, 123/25 A; 261/18 A, 18 B, 123, DIG. 42, 122; 55/248, 255, 256, 440

[56] References Cited

U.S. PATENT DOCUMENTS

| | | | |
|---|---|---|---|
| 3,716,040 | 2/1973 | Herpin | 261/18 A |
| 3,862,819 | 1/1975 | Wentworth, Jr. | 431/4 |
| 4,014,637 | 3/1977 | Schena | 431/4 |
| 4,133,628 | 1/1979 | Morrison | 123/25 R X |
| 4,173,450 | 11/1979 | Schrank | 431/190 |

FOREIGN PATENT DOCUMENTS 540952  3/1956  Italy .................. 123/25 A

Primary Examiner—Margaret A. Focarino
Attorney, Agent, or Firm—Panitch Schwarze Jacobs & Nadel

[57] ABSTRACT

The invention relates to a method and apparatus for introducing a catalyst into a fuel mixture. The method includes placing water in a container; passing air through the water to ionize at least a portion of the air molecules wherein at least a major portion of the air ions have a negative charge; and introducing the ionized air into a fuel mixture. In this manner, the efficiency of the combustion of the fuel mixture is increased. The apparatus includes a container for holding water, a manifold mechanism for passing air through the water in the container in a number of streams of small bubbles and means for removing substantially all mist from the ionized air before the ionized air is removed from the container. Means are provided for removing the ionized air from the container after the air has passed through the water and for then introducing the ionized air into a fuel mixture.

10 Claims, 6 Drawing Figures

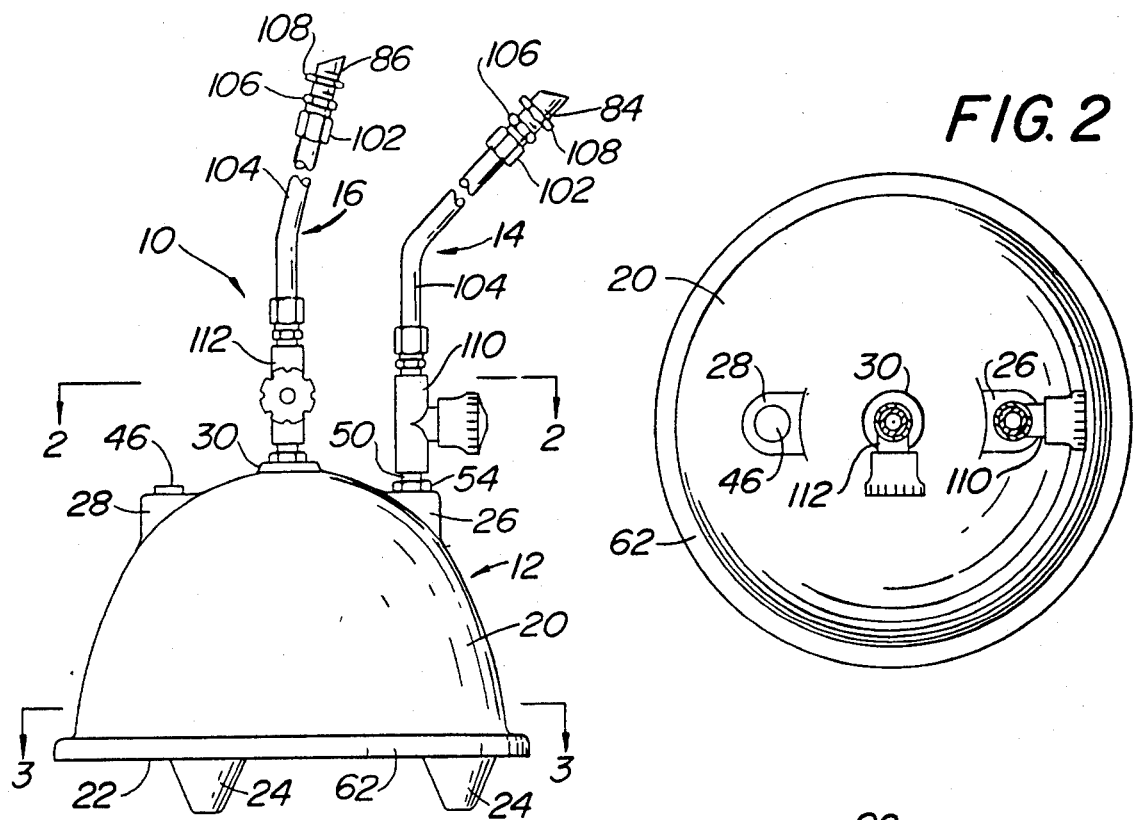
FIG. 1
FIG. 2
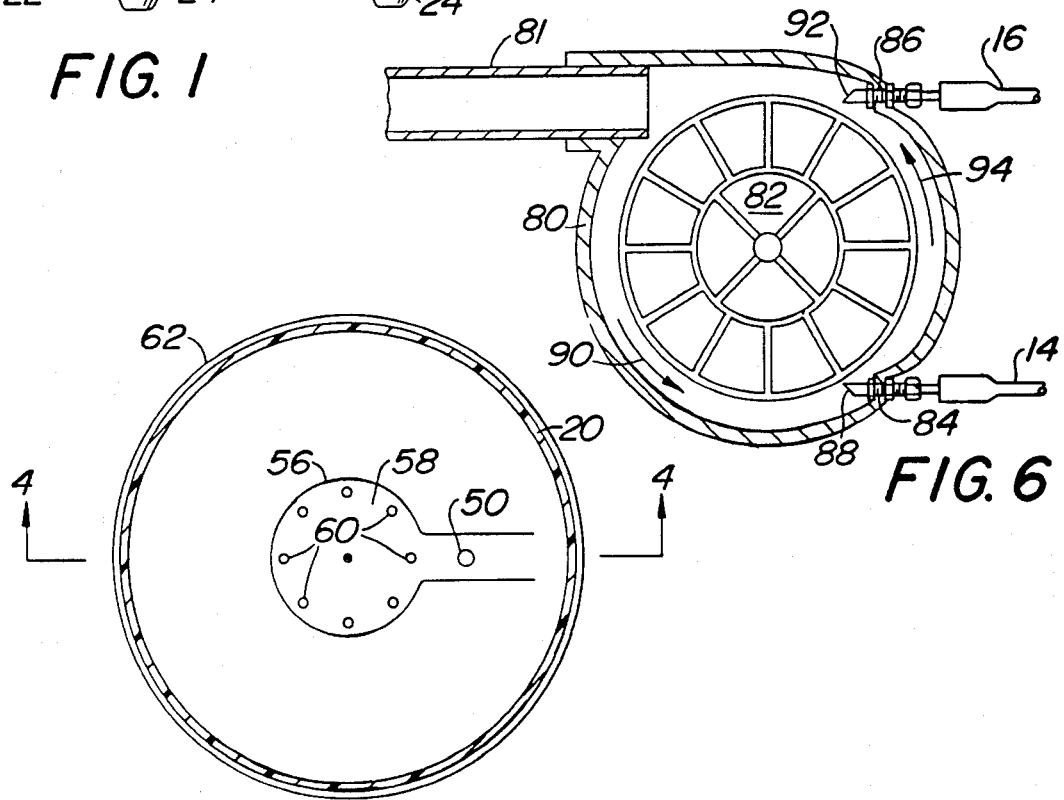
FIG. 3
FIG. 6

FOSSIL FUEL CATALYST GENERATOR

RELATED APPLICATIONS

This application is a continuation of copending application Ser. No. 06/287,014, filed July 27, 1981, which in turn was a continuation of copending application Ser. No. 06/012,411, filed Feb. 15, 1979, which in turn was a continuation-in-part of copending application Ser. No. 05/878,130, filed Feb. 15, 1978, all of the prior applications now having been abandoned.

BACKGROUND OF THE INVENTION

The present invention relates broadly to the production of a catalyst for introduction into fossil fuel burning burners, furnaces and related heat producing equipment. The catalyst is introduced into the heat producing equipment in order to increase the efficiency of the combustion process.

One type of prior art system utilizes water vapor or mist as the catalytic agent. Such a system is disclosed in U.S. Pat. No. 3,832,819 of Wentworth, Jr. (hereinafter "Wentworth"). Wentworth's apparatus utilizes a tube having a single inlet opening for bubbling air under pressure through water within a container. The air under pressure is supplied through a conduit connected to the air blower or a fossil fuel combustion system. The water in the container has a thin layer of oil floating on its upper surface. The air is bubbled through the water in such a manner to produce particles of water vapor or mist which are coated with a layer of oil. An outlet conduit is connected above the water level and withdraws the oil-coated vapor or mist from the container and introduces it into the air blower. Since water vapor is being withdrawn from the container, a water supply and water level control mechanism are utilized.

While the apparatus disclosed in Wentworth utilizes water vapor or mist as the catalytic agent, the present invention is designed to utilize relatively dry ionized air as the catalytic agent. A mist removing mechanism is provided for removing water mist from the ionized air before it exits from the container of the present invention. The need for using oil as a rust preventing agent with water vapor or mist is thus eliminated. Further, Wentworth's apparatus bubbles air through the water and oil in the container in a single stream of bubbles. This is not believed to be sufficient to effectively ionize air as in the present invention.

U.S. Pat. No. 3,767,172 of Mills (hereinafter "Mills") discloses an apparatus for producing a mist of a fluid, for example, a mixture of water and methly alcohol, and for introducing the mist into a fuel inlet stream of an internal combustion engine. The mist is produced by bubbling air through water in a container, such as a quart jar. Air is introduced into the container through an air inlet in the top of the container. A tube within the container connects the air inlet to an aerator member on the bottom of the container. The aerator has an open bottom which is sealed against the bottom inside wall of the jar and has a plurality of small holes to allow the gas to escape into the water in narrow steams of fine bubbles.

The air inlet of Mills' apparatus has a metering system to control the amount of air allowed into the container which in turn controls the amount of bubling and, hence, the amount of mist produced in the container. The inlet air is adjusted until a cloud appears above the fluid within the container indicating a large quantity of fluid entrained in the air. The air with its entrained mist is then introduced into the fuel stream between the output of the carburetor and the input to the engine's cylinders.

The present invention is for use only with stationary combustion apparatus, such as boilers, water heaters and furnaces, in which the fuel is continuously burned to produce heat. The present invention is not adapted for use with internal combustion engines wherein the fuel is being burned intermittently, not to produce heat, but rather to produce expansion force.

Mills, like Wentworth, is concerned with introducing mist into a fuel system wherein the mist itself is the catalytic agent. By introducing the mist into the fuel mixture, the fuel is being modified. In the present invention, the catalyst is the ionized air. Thus, in the present invention, the air, not the fuel, is being modified. As set forth more particularly hereinafter, substantially all mist produced by bubbling air through water in the container of the apparatus of the present invention to produce ionized air is removed from the ionized air before the ionized air is removed from the container and introduced into an air stream for ultimate mixing with the fuel in a combustion chamber.

The present invention is based upon the discovery that the apparatus and method described herein produces significantly more efficient combustion of fossil fuels in fossil fuel combustion systems. When using the present invention, the following observable results have been noted: a significant increase in carbon dioxide content of flue gases; a marked downward shift of the smoke point; significant changes in stack temperatures, either upward or downward, depending on the amount of carbon present on heat exchange surfaces at time the invention is applied to the system; the flame envelope is more uniform in appearance; a marked brightening of the fire; reduction of running time of the burner; and dramatic reductions in fuel consumption while producing the same amount of heat.

Although these observable results have been noted, the scientific causes and/or theories relating to such results are not understood. It is believed that the enhanced efficiency of the combustion apparatus connected to the apparatus of the present invention is due to the presence of ionized air produced by the catalyst generator of the present invention, although the inventors do not wish to be bound by any suggested theory.

The existence of air ions in the atmosphere is well known. See, for example, A. P. Krueger and S. Sigel, "Ions In The Air", *Human Nature*, July 1978, pp. 46, 48 and 52:

"Air ions are molecules of the common atmospheric gases that have taken on a negative or a positive charge. Their formation begins when energy produced by radioactive elements in the soil or by cosmic rays causes a gaseous molecule to lose an electron. The freed electron attaches to an adjacent molecule and the original molecule then has a positive charge, its neighbor, a negative one. Water vapor, oxygen, and hydrogen molecules cluster about the charged particle to form a "small air ion". The speed with which air ions form and recombine to neutralize their charges means there can be, at most, several thousand ions per cubic centimeter of air. The same cubic centimeter contains about 10 million trillion uncharged particles.

There are other natural sources of energy that increase the number of ions in the air, among them the shearing of water molecules in waterfalls or in the pounding of the surf and the movement of great winds across large land masses, like the foehn of Germany and the mistral of France."

When air is passed through the water in the container of the apparatus of the present invention in a plurality of streams from the manifold adjacent the bottom of the container, it is believed that the interaction between the several streams of small air bubbles and the water interacts to create positively and negatively charged air ions. (The ions may be caused by the shearing of water molecules contained in the air introduced into the container or, perhaps, water molecules may be picked up by the air as it passes through the water.)

In one test of the apparatus according to the present invention, the ambient laboratory air contained about 1300 positive ions and about 1000 negative ions per cubic centimeter as measured by an ion collection chamber in conjunction with an electrometer. The ambient air in the laboratory was passed through the apparatus according to the present invention containing demineralized water at a depth of about 9 inches. After passing through the apparatus, about 7 million positive ions were detected and about 11 million negative ions were detected. Thus, not only were more ions formed by the apparatus than in the ambient atmosphere, but also the major portion of the ions formed had a negative charge.

In addition to generating air ions wherein a major portion of the ions are negatively charged, the apparatus according to the present invention is believed to cause the production of ozone, tri-atomic oxygen ($O_3$). Upon introducing ozone to high heat and turbulence, the ozone degrades instantly into pure oxygen which enhances combustion. This could account for the immediate brightening of the fire upon the introduction of the ionized air from the apparatus. In addition, some ozone-sensitive people in the vicinity of the apparatus of the present invention have reported discomfort similar to the discomfort felt when being subjected to ozone. It is believed that the formation of ozone in the apparatus of the present invention is similar to the formation of ozone associated with electrical storms.

Again, while the inventors do not wish to be bound by any particular theory, they believe that introduction into the air/fuel mixing apparatus of combustion equipment, at or immediately prior to ignition of a small quantity of ionized air containing a major portion of either positively charged ions or negatively charged ions, but in this instance, negatively charged ions, increases the frequency and velocity of random trajectories of the fuel and air molecules and combustion radicals present in the combustion process. It is believed that this causes more precise cracking of hydrocarbons, thus releasing more of their latent energy to make the combustion process significantly more efficient.

Consequently, fossil fuel burning apparatus can be operated closer to the smoke point at more precise air to fuel ratios, materially reducing the amount of excess air generally required in conventional combustion vessels to achieve a substantially smokeless fire. The predictable result is increased exposure time of the hot gases to the heat exchange surfaces (since less excess air is required to alleviate the formation of smoke), and significant reductions in the quantity of energy being exhausted through the stack. In many instances, fuel firing rates can be reduced without curtailing production of heat.

In one analysis of flue gas of a non-forced draft gas fired burner prior to and subsequent to the application of the apparatus of the present invention, the following results were noted. Before the apparatus was applied, the percentage of carbon dioxide in the flue gas from a low fire was 4.5%, in a high fire 5.0% and the stack temperature was 790° F. After the application of the apparatus of the present invention, the percentage of carbon dioxide in the flue gas was 6.5% for a burner burning with a low fire, 8.0% for a burner burning with a high fire and the stack temperature was 750° F. Comparable results were achieved using this invention with forced air draft oil fired boilers.

The percentage of carbon dioxide flue gas is a direct function of hydrocarbon cracking. An increase in the quantity of hydrocarbons cracked is directly proportional to an increase in carbon dioxide in the flue gas. Likewise, the number of hydrocarbons cracked in the combustion process is directly related to the amount of energy released. The drop in flue gas temperatures indicated in these tests is the result of more rapid cracking of hydrocarbons caused by the present invention. The test data for the burner prior to the installation of the apparatus according to the present invention indicates an excessive amount of partially cracked hydrocarbons passing through a combustion chamber and out the exhaust stack carrying with them quantities of unreleased energy.

SUMMARY OF THE INVENTION

A method of introducing a catalyst into a fuel mixture according to the present invention comprises the steps of:

(a) placing water in a container;
(b) producing ionized air by pasing air through the water to ionize at least a portion of the air molecules wherein at least a major portion of the air ions have a negative charge;
(c) producing relatively dry ionized air by removing substantially all water mist from the ionized air prior to removing the ionized air from the container; and
(d) introducing the relatively dry ionized air into a fuel mixture whereby the efficiency of the combustion of the fuel mixture is increased.

Apparatus according to the present invention comprises:

a container for holding water;
means for ionizing air comprising means for passing air through water in the container including a manifold adjacent the interior bottom of the container, the manifold having a plurality of outlet holes and a conduit connected to the manifold for introducing air to the manifold;
means for removing substantially all water mist from the ionized air prior to removing the ionized air from the container; and
means for removing the ionized air from the container and for introducing the ionized air removed from the container into a fuel mixture.

The method and apparatus according to the present invention have been found to provide a fuel savings of approximately 10 to 30% when compared with prior art methods and apparatus which introduces water mist or vapor into fossil fuel combustion systems.

DEFINITIONS

The definitions of the following terms as set forth in this section shall apply throughout the specification and claims:

"Demineralized" water is water in which the mineral matter has been removed therefrom. Methods of demineralizing water include, e.g., ion-exchange techniques, distillation or electrodialysis.

"Ionized air" means air wherein a significantly greater than normal portion of the molecules forming the air have been positively or negatively charged. These molecules include, by way of example rather than by way of limitation, nitrogen, oxygen, hydrogen and water vapor. It is not known exactly which molecules of the air become ionized, only that air molecules are ionized. Perhaps a portion of all of the listed molecules and others contained in air is charged, but perhaps only a portion of some or one of the air molecules is charged.

"Mist" means water in the form of discrete liquid particles. "Mist" is distinguished from "water vapor" in that water vapor is gaseous water which is not in the form of discrete liquid particles.

Air or ionized air which is "relatively dry" has a relative humidity between about 45 and about 76%.

"Substantially" when used with amounts, such as in the phrase "'substantially' all mist is removed", means at least 90% by weight of the mist is removed. Thus, "substantially" means greater than or equal to 90%.

BRIEF DESCRIPTION OF THE DRAWINGS

For the purpose of illustrating the invention, there is shown in the drawings a form which is presently preferred; it being understood, however, that this invention is not limited to the precise arrangement and instrumentalities shown.

FIG. 1 is a front elevation view of the catalyst generator in accordance with the present invention.

FIG. 2 is a view taken along lines 2—2 of FIG. 1.
FIG. 3 is a view taken along lines 3—3 of FIG. 1.
FIG. 6 is a diagrammatic sectional view of the first and second conduits inserted into an air blower of a fossil fuel combustion system.

DETAILED DESCRIPTION OF THE PREFERRED EMBODIMENTS

Figure 4:
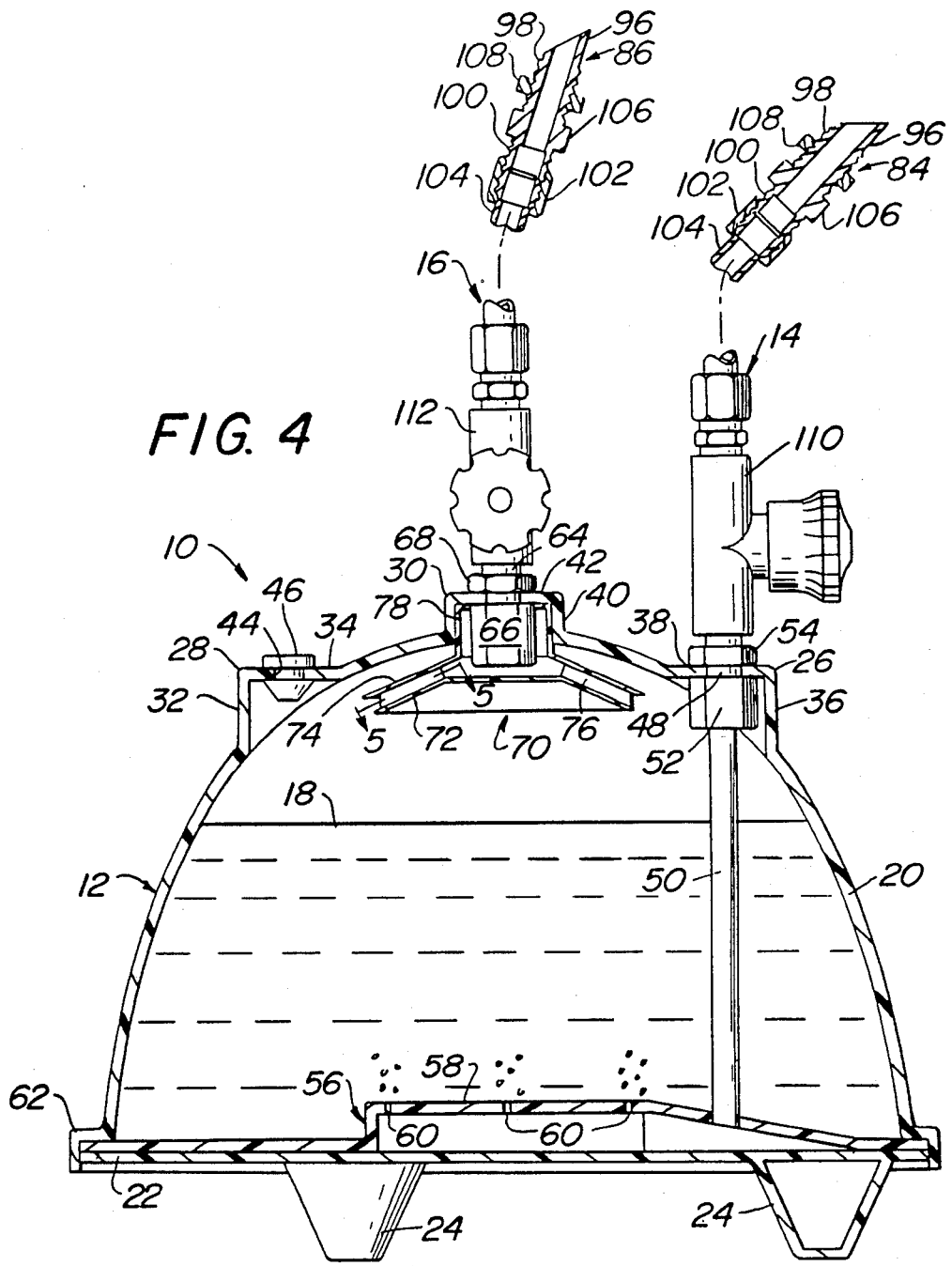
FIG. 4 is a view taken along lines 4—4 of FIG. 3.
Figure 5:
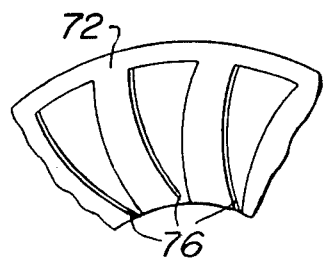
FIG. 5 is a view taken along lines 5—5 of FIG. 4.

Referring to the drawings in detail, wherein like numerals indicate like elements, there is shown in FIG. 1 a catalyst generator in accordance with the present invention designated generally as 10. The catalyst generator 10 includes a dome-shaped container 12, an inlet conduit 14 and an outlet conduit 16. The container 12 is preferably constructed of a transparent or translucent polymeric plastic material of a relatively high heat resistance. The container 12 is designed to contain a quantity of demineralized water 18. The specific size of the container 12 and the specific quantity of demineralized water 18 contained therein is dependent upon the size of the fuel combustion device that is utilized with the catalyst generator 10. The generator 10 should be electrically insulated from grounding sources or sources of electricity for reasons set forth hereinafter.

The container 12 is constructed of a dome-shaped upper section 20 and a base section 22. The base section 22 has a plurality of legs 24 extending downwardly therefrom. The legs 24 are preferably in the form of inverted truncated cones. A pair of side projections 26, 28 and a central projection 30 extend outwardly from the dome-shaped upper section 20. As best seen in FIG. 4, the side projection 28 has a vertical shoulder 32 extending upwardly from a curved portion of the container 12 and a flat horizontal shoulder extending outwardly from another curved portion of the container 12. Side projection 26 includes a similar vertical shoulder 36 and horizontal shoulder 38. Central projection 30 has an annular generally vertical shoulder 40 and a horizontal shoulder 42.

An inlet port 44 extends through shoulder 34. The demineralized water 18 is poured into the container 12 through the inlet port 44. A removable sealing cap 46 closes the inlet port 44.

A hole through the shoulder 38 serves as an inlet for conduit 14. Conduit 14 includes a pipe 50 which extends through the hole 48. The pipe 50 is secured in position by a pair of nuts 52, 54 each of which tightens down on an opposite side of shoulder 38.

The pipe 50 is connected to a manifold 56. Inlet conduit 14 is connected to a suitable source of air under pressure. Various sources of air under pressure will be discussed more fully hereinafter. In this manner, pipe 50 supplies the manifold 56 with air under pressure. The manifold 56 has a horizontally disposed circular surface 58. The surface 58 is spaced a short distance above the base section 22. The use of a manifold is critical to this invention. It is believed that the air may be ionized effectively only if it is passed through the demineralized water in a plurality of small streams so that the surface area of the air entering the generator 10 is maximized to create sufficient shearing action between the air and the demineralized water.

A plurality of holes 60 extend through the surface 58 and provide communication between the interior of the manifold 56 and the interior of the container 12. The holes should have a diameter between about 0.015 and about 0.060 inch. In one preferred embodiment of the invention, the manifold 56 contains four holes 60 each having a diameter of 0.042 inch. In another embodiment, the manifold 56 contains three holes 60 each having a diameter of 0.042 inch. As seen in FIG. 3, at least a number of the holes 60 are preferably arranged in a circular pattern generally in the center of the base section 22. When pressurized air is supplied to the manifold 56, a plurality of air bubble streams passes into the demineralized water 18. See FIG. 4. As was discussed hereinbefore, the passage of the air through the demineralized water is believed to ionize the air and to cause a major portion of the ions to be negatively charged.

The dome-shaped section 20, the base section 22 and the manifold 56 each preferably are made of a transparent or translucent polymeric plastic material. An annular flange 62 extends from the lowermost edge of the dome-shaped section 20 and encircles the outer circumference of both the manifold 56 and the base section 22. The manifold 56 is secured in an airtight and watertight condition between the upper surface of the base section 22 and the flange 62. When the dome-shaped setion 20, the base section 22 and the manifold 56 are formed of a polymeric plastic material, they are preferably joined together by a chemical welding process. Of course, any suitable joining process, such as adhesive bonding or the like, may be utilized.

The conduit 16 includes a pipe 64 which extends through a hole in the shoulder 42 and is secured there by a pair of nuts 66, 68. The ionized air which has been produced by passage through the water 18 thus passes out of the container 12 by way of the pipe 64. In the preferred embodiment, negative pressure is applied to the conduit 16 by a suitable source. It has been found that to be effective, it is critical that the conduit 16 have a length no greater than ten feet, and preferably, no greater than six feet. It is believed that if the conduit 16 has a length greater than 10 feet the ions may recombine in the conduit and not effectively catalyze combustion. Although the reasons are not known, by experimentation it has been determined that ten feet is the maximum effective length of the conduit 16.

Before the ionized air leaves the container 12, substantially all water mist is removed from the processed air by a baffle means designated generally as 70. The baffle means 70 includes a generally conical shaped lower plate 72 and a generally conical shaped upper plate 74. A plurality of curved condensing vanes 76 are secured between the lower and upper plates 72, 74.

The plates 72, 74 and vanes 76 are preferably constructed of a polymeric plastic material and chemically welded or otherwise bonded to one another. An annular shoulder or flange 78 is integral with and extends upwardly from the upper plate 74. The baffle means 70 is secured within the container 12 by attaching the flange 78 to the interior surface of central projection 30. When both the plate 74 and the container 12 are constructed or a polymeric plastic material, the flange 78 is preferably secured to the central projection 30 by a chemical welding process.

Processed air is thus constrained to leave the container 12 by way of the passages formed between the plates 72, 74 and the vanes 76. Moisture, such as water mist, which may be contained in the processed air condenses upon the plates 72, 74 and vanes 76. The condensed water thereafter drains downwardly back to the supply of water 18. In this manner, relatively dry processed air is supplied to the conduit 16.

The baffle means 70 is an important aspect of the present invention. The prior art devices intentionally cause water mist to enter the combustion chamber of a fossil fuel combustion device. The baffle means 70 of the present invention prevents substantially all water mist from entering the conduit 16 and thereby prevents moisture in the form of water mist from entering the combustion chamber. With the prior art devices, unless the amount of mist is very carefully controlled, the mist has an adverse effect on the efficiency of combustion. The "relatively dry" ionized air which enters conduit 16 has a relative humidity of about 45 to about 76%. If ambient air having a relative humidity less than this range is introduced into the apparatus, it will tend to become humidified. If ambient air having a relative humidity greater than this range is introduced into the apparatus, it will have its humidity decreased by passing through the generator.

Another important function of the baffle is to reduce evaporation of water from the container to a negligible amount. The generator of the present invention does not require a water level controlling device attached to a source of water to replenish water evaporated as in the prior art devices. Rather, evaporation is so slight that over the course of a year it is only necessary to add about 2 quarts of water to a generator whose container holds about 3½ gallons. By removing substantially all of the mist from the processed air within the container 12, an electrical connection or grounding cannot be accomplished by means of the mist in the air stream between the generator 10 and a blower 80 or a fossil fuel combustion device. It is believed that the electrical grounding or connection of the generator 10 will adversely affect the production and/or the utilization of the ionized air catalyst, perhaps by causing the recombination of the charged ions to form molecules or the attraction of the ions to the source of the grounding or the source of the electricity.

The conduit 16 thereafter passes the processed air out of the container 12 to be mixed with ambient air and ultimately to the combustion area of a fossil fuel combustion device. The processed air is believed to be ionized and is believed to contain a major portion of negatively charged ions and ozone. The processed air increases the efficiency of the combustion process and is considered to be the catalyst formed in accordance with the present invention. This catalytic action increases the amount of energy extracted from a given amount of fuel. Also due to the catalytic action, specified temperature levels can be achieved within a shorter time span and the amount of fuel consumed to reach the specified temperature levels is proportionately reduced.

FIG. 6 illustrates one method of utilizing the catalyst generator with a combustion device. A centrifugal air blower 80 forces air into pipe 81 which in turn connects with the combustion chamber of a fossil fuel combustion device. Impeller 82 forces air in a circular pattern along the interior circumference of the blower 80 and past the end 84 of conduit 14 and the end 86 of conduit 16. The ends 84 and 86 preferably are positioned within the blower 80 so that a positive pressure is applied to conduit 14 and a negative pressure is applied to conduit 16.

To aid in the creation of the positive and negative pressures within conduits 14 and 16, the ends 84, 86 are beveled. By placing the open portion 88 of beveled end 84 within the air flow stream as indicated by arrow 90, forced air or positive air pressure is applied to the conduit 14. By placing the closed portion 92 of the end 86 within the air flow path as indicated by arrow 94, air flows around the beveled end 86 and creates a suction force or negative pressure in the conduit 16. A relative vacuum thus exists in the area above the water level within the container 12.

The ends 84, 86 of conduits 14, 16 are mounted rotatably within the wall of air blower 80. The rotatability of the ends 84, 86 permits the positive and/or negative pressure within the conduits 14 and 16 to be adjusted by placing more or less of the open and/or closed portions 88, 92 within the air stream. Since the ends 84, 86 are constructed identically, only end 84 will be described in detail. Like numerals will indicate like elements in the end 86. The end 84 is constructed of a tube 96. The tube 96 has a first threaded portion 98 which is adapted to screw into threads of a hole in the wall of air blower 80. A second threaded portion 100 screws into a coupling member 102 which connects the end 84 to the tubing 104. The tubing 104 is preferably formed of a flexible polymeric plastic material which is not an electrical conductor and forms the medial or intermediate section of conduit 14. A finger grip ring 106 separates the first threaded portion 98 from the second threaded portion 100. The finger grip 106 serves as a grip for adjusting the rotative position of the end 84. Once the proper rotative position has been determined, i.e., the suitable positive and/or negative pressure has been attained, the rotative position of the end 84 is secured by tightening the nut 108 onto the outer surface of the air blower.

The tubing 104 of conduit 14 is connected to the pipe 50 by way of valve member 110. Similarly, tubing 104 of conduit 16 is connected to the pipe 64 by way of valve member 112. Any suitable means may be utilized for coupling the tube 104 of the conduits 14, 16 to the valve members 110, 112, respectively. Valves 110, 112 provide control of the amount of air flowing into and out of the container 12.

The operation of the catalytic generator 10 should be self-explanatory from the above description. Hence, only a short summary of its operation follows. Air under pressure is supplied to the manifold 56 by way of conduit 14. In the preferred embodiment, the air is forced through conduit 14 by means of an air blower 80. However, an air pressure source, such as a pump distinct from a combustion apparatus, may be utilized to supply the air. A separate pump is often required when the generator is used with small residential furnaces wherein the air delivery system of the furnace is incapable of creating sufficient pressure.

The air is bubbled through demineralized water 18 in a plurality of streams. As set forth hereinbefore, it is believed that it is critical that the air be introduced into the water within the container 12 in a plurality of streams. The amount of the shearing action between the air bubbles and water is proportional to the amount of friction generated between the air and the water, which in turn is proportional to the length of travel and the time of travel of the air through the water.

It has been found to be critical that an absolute minimum water depth of $1\frac{1}{2}$ inches be contained in the container 12. With $1\frac{1}{2}$ inches of water in the container, a generator according to the present invention is suitable for use with a burner capable of burning 3 gallons of oil per hour and 4500 cubic feet of air per hour. A unit having a water depth of 3 inches may be used with a burner using 12 gallons of oil per hour and 18,000 cubic feet of air per hour. A unit having a water depth of 5 inches may be used with a burner using 25 gallons of oil per hour and 37,500 cubic feet of air per hour. A unit wherein the water depth is 6 inches may be used with a burner which uses 40 gallons of oil per hour and 60,000 cubic feet of air per hour. A unit having a water depth of 9 inches may be used with a burner capable of burning 75 gallons of oil per hour using 112,500 cubic feet of air per hour. These water depths are all fixed depths which should not vary by more than about 20% by the baffle means 70 within the container 12. It has been found that no significantly further ionization of the air is attained by using a depth of water greater than 9 inches.

After passing through the demineralized water, it is believed that the air becomes ionized and a major portion of the air ions have a negative charge. Also, it is believed that ozone is generated. Prior to exiting the container 12, substantially all water mist is removed from the processed air by the baffle means 70 and the condensed water drips down to the water supply 18. The relatively dry processed air is thereafter drawn out of the container 12 through the conduit 16, mixed with ambient air and injected into the combustion area of a fossil fuel combustion device. The processed air increases the efficiency of the combustion process.

The generator of the present invention can be constructed in various sizes. The following dimensions should be considered merely exemplary of two sizes of generators that have been found particularly satisfactory. One type of generator designed to hold $1\frac{1}{2}$ gallons of water at a depth of 4 inches has a maximum diameter of 11 inches and a height of $6\frac{1}{2}$ inches. Another size of generator which is designed to hold $3\frac{1}{2}$ gallons of water at a depth of 6 inches has a maximum diameter of 13 inches and a height of 9 inches. Depending upon the size of the furnace with which the generator is to be used, larger and smaller generators can be constructed to hold both larger and smaller amounts of water.

The present invention may be embodied in other specific forms without departing from the spirit or essential attributes thereof and, accordingly, reference should be made to the appended claims, rather than to the foregoing specification, as indicating the scope of the invention.

We claim:

1. An apparatus for introducing a catalyst into a fuel-air mixture for combustion in stationary combustion apparatus comprising:

a container for holding water;

means for passing air through water in said container to produce processed air;

means for removing substantially all moisture in the form of mist from said processed air to produce processed air prior to removing said processed air from said container; and means for removing said processed air from said container and for introducing said processed air removed from said container into a fuel-air mixture of stationary combustion apparatus, said means for removing substantially all moisture includes a baffle secured to the uppermost portion of said container upstream of and communicating with a container outlet, said baffle comprising a pair of plates having peripheral portions extending outwardly and downwardly from central portions thereof, said plates being spaced one above the other and attached together by radial vanes secured between said plates, said upper plate having means surrounding an opening for securing said baffle to said container adjacent said outlet, wherein a space is formed between said plates, said vanes and said securing means provides a tortuous path for processed air being removed from said container whereby substantially all moisture in the form of mist contained in said processed air is removed from said processed air.

2. Apparatus in accordance with claim 1 wherein said vanes are curved from said central portion outwardly.

3. Apparatus in accordance with claim 1 wherein the container for holding water is dome-shaped.

4. Apparatus in accordance with claim 1 wherein said means for passing air through water includes a manifold having a plurality of outlet holes adjacent the interior bottom of said container and a means for introducing air under pressure to said manifold.

5. Apparatus in accordance with claim 4 wherein said means for passing air through water includes a first conduit communicating between said manifold and an air blower of said stationary combustion apparatus, and wherein said means for introducing said processed air into a fuel-air mixture is a second conduit connecting said means for removing said processed air and said air blower at a location downstream from said first conduit.

6. Apparatus in accordance with claim 5 wherein said first conduit has a beveled end portion coupled by rotatable coupling means to the conduit to be rotatably supported in the air stream within said air blower, said beveled end portion forming in part means for adjusting the pressure of the air entering said container, and said second conduit has a beveled end portion coupled by rotatable coupling means to the conduit to be rotatably supported in the air stream of said air blower to create a negative pressure in said container, said beveled end portion of said second conduit forming in part means for adjusting the negative pressure applied to said container.

7. Apparatus in accordance with claim 4 wherein said means for introducing air under pressure to said manifold is a conduit connected to said manifold and to a blower.

8. Apparatus in accordance with claim 7 wherein at least some of said holes through said manifold are arranged in a circular configuration about the center of the bottom of said container.

9. Apparatus in accordance with claim 5 wherein said second conduit has a maximum length of no more than ten feet.

10. Apparatus in accordance with claim 9 wherein said second conduit is no more than six feet in length.

* * * * *